3,413,290
PHENOTHIAZINE DERIVATIVES
Jany Renz, Basel, Jean-Pierre Bourquin, Magden, and Gustav Schwarb, Allschwil, Switzerland, assignors to Sandoz Ltd. (also known as Sandoz A.G.), Basel, Switzerland
No Drawing. Filed Nov. 21, 1966, Ser. No. 595,585
Claims priority, application Switzerland, Nov. 23, 1965, 16,101/65, 16,102/65
4 Claims. (Cl. 260—243)

ABSTRACT OF THE DISCLOSURE

3 - alkylsulphinyl-10-(3-dialkyaminopropionyl)phenothiazines of the formula

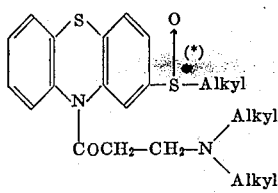

(each alkyl of which has from 1 to 4 carbon atoms) and their acid addition salts are antidepressants.

---

The present invention relates to new heterocyclic compounds and a process for their production.

The present invention provides compounds of general Formula I,

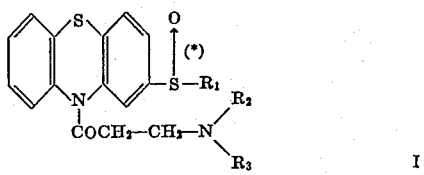

in which each of $R_1$, $R_2$ and $R_3$ signifies an alkyl radical having from 1 to 4 carbon atoms, their optically active isomers and their acid addition salts.

The present invention further provides a process for the production of compounds I, their optically active isomers and their acid addition salts, characterized in that a compound of general Formula II,

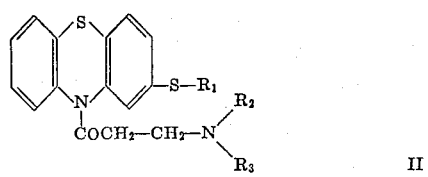

in which $R_1$, $R_2$ and $R_3$ have the above significance, is oxidized with hydrogen peroxide in an organic solvent which is inert under the reaction conditions and the resulting compound of general Formula I is then optionally separated into its optically active isomers and/or salified.

The compounds of general Formula II are advantageously used in the form of their salts with strong organic or inorganic acids. Examples of acids for salt formation with compounds II are: fumaric, maleic, methanesulphonic, hydrochloric and hydrobromic acid.

Suitable organic solvents, which are inert under the reaction conditions, for the oxidation of compounds II or their salts are the lower aliphatic alcohols, e.g. ethanol. The oxidation is effected with a slight excess of one equivalent (at most 10%) of hydrogen peroxide, at a temperature between 50° and 150° C.; the reaction time is from 1 to 4 hours.

The separation of compounds of general Formula I into their optically active isomers is effected in accordance with the invention with optically active acids, e.g. L-(+)- or D-(—)-mandelic acid.

One preferred method of effecting the process of the invention consists of adding dropwise during the course of one hour an excess of 10% of hydrogen peroxide to a solution of the hydrochloric acid salt of a compound of general Formula II in ethanol at the boiling temperature of the solution. After the reaction has been completed, the resulting compounds of general Formula I are isolated and purified in manner known per se, e.g. by recrystallization, chromatography and/or salt formation, and are then optically converted into their acid addition salts by reacting them with organic or inorganic acids.

The separation of the compounds of general Formula I into their optically active isomers is effected by dissolving the compound I, together with L-(+)-mandelic acid, preferably in equimolar amounts, in as little boiling absolute ethanol as possible. On cooling the solution to room temperature, the salt of the (+) compound of general Formula I crystallizes. After crystallization has been completed, the solution is filtered and the salt recrystallized from absolute ethanol.

The (—) compound of general Formula I is obtained by concentrating the absolute ethanol mother liquor by evaporation, converting the salt present therein into the free base in manner known per se, dissolving in as little boiling absolute ethanol as possible together with a levorotatory optically active carboxylic acid, e.g. D-(—)-mandelic acid, and allowing the solution to crystallize at room temperature. The salt of the (—) compound of general Formula I which crystallizes is filtered off and recrystallized from absolute ethanol.

The optically active salts may subsequently be converted into the optically active free bases of general Formula I in manner known per se, e.g. by treating with aqueous alkalies. The resulting optically active compounds of general Formula I may subsequently be converted into their acid addition salts by reacting with organic or inorganic acids.

The compounds of general Formula II used as starting materials are new and may be obtained by reacting a compound of general Formula III,

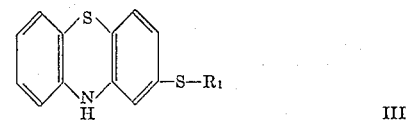

in which $R_1$ has the above significance, is reacted with a compound of general Formula IV, $$Hal—CO—CH_2—CH_2—Hal \qquad IV$$

in which Hal signifies a chlorine or bromine atom, in an organic solvent which is inert under the reaction conditions, e.g. toluene, and subsequently the resulting compound of general Formula V,

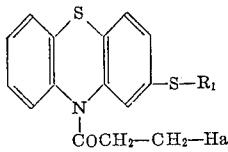

in which $R_1$ and Hal have the above significance, with a compound of general Formula VI,

in which $R_2$ and $R_3$ have the above significance, preferably using an excess of the compound of general Formula VI, in an organic solvent which is inert under the reaction conditions, e.g. benzene.

Compounds I and their optically active isomers are oily or crystalline compounds at room temperature; with organic or inorganic acids they form stable salts which are crystalline at room temperature. Examples of acids for acid addition salt formation with compounds I are: hydrochloric, citric, tartaric, succinic, maleic, malic, acetic, benzoic, fumaric, gallic, hexahydrobenzoic, methanesulphonic, benzenesulphonic, naphthalene-1,5- disulphonic and phosphoric acid.

Compounds I, their optically active isomers and their physiologically tolerable salts with organic or inorganic acids are characterized by typical properties of antidepressants, which manifest themselves inter alia by an inhibition of the tetrabenazine syndrome and a central anticholinergic effect. The peripheral anticholinergic effect is weak. Compounds I, their optically active isomers and their physiologically tolerable salts with organic and inorganic acids are, therefore, indicated for use in the treatment of conditions of depression or psychosomatic and neurotic illnesses in hospitalized and ambulant patients. A suitable daily dose of compounds I or their optically active isomers is 20 to 500 mg.

The compounds of the invention may be used as pharmaceuticals on their own or in the form of appropriate medicinal preparations for administration, e.g. enterally or parenterally. In order to produce suitable medicinal preparations the compounds are worked up with organic or inorganic adjuvants which are inert and physiologically acceptable. Examples of such adjuvants are:

For tablets and dragées ____ Lactose, starch, talc and steric acid.
Syrups _____ Solutions of cane sugar, invert sugar and glucose.
Injectionable solutions _____ Water, alcohols, glycerin and vegetable oils.
Suppositories _____ Natural or hardened oils and waxes.

The preparations may furthermore contain suitable preserving, stabilizing and wetting agents, solubilizers, sweetening and colouring substances and flavorings.

Each of the above mentioned pharmacologically effective compounds may be used, for example, for oral administration in the form of a tablet having the following composition:

1–3% of binding material (e.g. tragacanth), 3–10% of starch, 2–10% of talcum, 0.25–1% of magnesium stearate, the corresponding amount of active material and filling material, e.g. lactose, to make up 100%.

The term "in manner known per se" as used herein designates methods in use or described in the literature on the subject.

In the following non-limitative examples all temperatures are indicated in degrees centigrade and are corrected.

EXAMPLE 1

3-methylsulphinyl-10-(3-diethylaminopropionyl)-phenothiazine (A) 3-METHYLMERCAPTO-10-(3-CHLOROPROPIONYL)-PHENOTHIAZINE 28.5 g. of 3-chloro-propionic acid chloride are added dropwise at a bath temperature of 150° whilst stirring to a boiling solution of 50.0 g. of 3-methylmercapto-phenothiazine in 200 cc. of toluene during the course of half an hour and boiling is then effected for a further 4 hours. After cooling well, filtration and crystalization from benzene are effected. Pure 3-methylmercapto-10-(3-chloropropionyl)-phenothiazine has a melting point of 102–104°.

(B) 3-METHYLMERCAPTO-10-(3-DIETHYLAMINOPROPIONYL)-PHENOTHIAZINE

A mixture of 31.2 g. of 3-methylmercapto-10-(3-chloropropionyl)-phenothiazine, 27.2 g. of diethylamine and 125 cc. of benzene is kept at a bath temperature of 70° whilst stirring for 4 hours. After cooling, dilution is effected with 150 cc. of benzene and extraction is effected with 200 cc. of a 15% aqueous tartaric acid solution. The tartaric acid extract is washed out with 75 cc. of benzene, is made alkaline with approximately 50 cc. of concentrated sodium hydroxide and the precipitated oily base is taken up in 250 cc. of benzene. The benzene layer is washed out with 75 cc. of water and then concentrated. The fumarate is produced in that 18.5 g. of the evaporation residue and 6.05 g. of fumaric acid are dissolved in 150 cc. of boiling acetone, the solution is filtered and cooled, whereby a precipitate results. The precipitate is crystallized from 2000 cc. of ethyl acetate, whereby the pure 3-methylmercapto-10-(3-diethylamino-propionyl)-phenothiazine fumarate, having a melting point of 117–119°, is obtained. The free base may subsequencly be obtained from the fumarate in manner known per se.

(C) 3-METHYLSULPHINYL-10-(3-DIETHYLAMINOPROPIONYL)-PHENTHIAZINE 27.25 g. of 3-methylmercapto-10-(3-diethylamino-propionyl)-phenothiazine are dissolved in 300 cc. of ethanol; a solution of hydrogen chloride in ethanol is added thereto until an acid reaction to Congo red is obtained, and 7.73 cc. of 35.4% hydrogen peroxide are added dropwise at a bath temperature of 110° whilst stirring during the course of one hour. After two hours 150 cc. of water are added to the reaction mixture and concentration is effected until ethanol no longer distills off. The concentrated solution is made alkaline with 45 cc. of a 3 N sodium hydroxide solution and the precipitated base is taken up in 150 cc. of chloroform. The chloroform solution is washed out with 50 cc. of water; drying over sodium sulphate and concentration are then effected. The fumarate is produced by dissolving 26.3 g. of the evaporation residue and 8.26 g. of fumaric acid in 120 cc. of absolute ethanol at the boil and then cooling. Crystallization is effected from 120 cc. of absolute ethanol, whereby the pure 3-methylsulphinyl-10-(3-diethylamino-propionyl)- phenothiazine fumarate, having a melting point of 139–141°, is obtained.

EXAMPLE 2

(+) and (−)-3-methylsulphinyl-10-(3-diethylamino-propionyl)-phenothiazine (A) (+)-3-METHYLSULPHINYL-10-(3-DIETHYLAMINOPROPIONYL)-PHENOTHIAZINE 16.64 g. of 3-methylsulphinyl-10-(3-diethylamino-propionyl)-phenothiazine and 6.85 g. of L-(+)-mandelic acid are dissolved in 250 cc. of absolute ethanol whilst heating for a short time to the boiling temperature of ethanol, and the resulting solution is allowed to crystallize at room temperature. Filtration is effected and the residue crystallized from 70 cc. of absolute ethanol. The resulting pure (+)-3-methylsulphinyl-10-(3-diethylamino-propionyl)-phenothiazine-L-(+)-mandelate has a melting point of 145-147° and, after further recrystallization, a constant rotation of $[\alpha]_D^{20} = +65.5° \pm 2°$ (c.=1 in methanol). The oily (+) base obtained from the L-(+) mandelate in manner known per se has a rotation of $[\alpha]_D^{20} = +51.5° \pm 2°$ (c.=1 in methanol).

(B) (−)-3-METHYLSULPHINYL-10-(3-DIETHYLAMINO-PROPIONYL)-PHENOTHIAZINE

The first absolute ethanol mother liquor obtained in accordance with Example 2(A) is concentrated by evaporation; 50 cc. of water and 10 cc. of concentrated ammonia are added to the evaporation residue and the precipitated oily base is taken up in 50 cc. of benzene. The benzene solution is washed out with 20 cc. of water and then concentrated. 8.0 g. of the evaporation residue and 3.29 g. of D-(−)-mandelic acid are dissolved in 120 cc. of boiling absolute ethanol and the resulting solution is allowed to cool to room temperature, whereby a crystalline precipitate is formed. This precipitate is crystallized from 50 cc. of absolute ethanol, whereby the pure (−)-3-methylsulphinyl-10-(3-diethylamino-propionyl) - phenothiazine D-(−)-mandelate, having a melting point of 145–147° and a constant rotation of $[\alpha]_D^{20} = -65.5°$ (c.=1 in methanol) is obtained after further recrystallization. The oily (−) base obtained from the D-(−)-mandelate in manner known per se has a rotation of $$[\alpha]_D^{20} = -52.0° \pm 2°$$

(c.=1 in methanol).

What is claimed is:
1. A compound selected from the group consisting of a compound of formula:

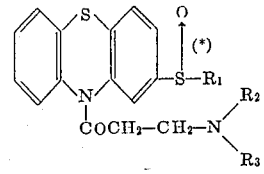

wherein each of $R_1$, $R_2$ and $R_3$ is, independently, alkyl having from one to four carbon atoms,
the optically active isomers and a pharmaceutically acceptable acid addition salt thereof.

2. A compound according to claim 1, in which the compound is 3-methylsulphinyl - 10 - (3-diethylamino-propionyl)-phenothiazine.

3. A compound according to claim 1, in which the compound is (+)-3-methylsulphinyl-10-(3-dietheylamino-propionyl)-phenothiazine.

4. A compound according to claim 1, in which the compound is (−)-3-methylsulphinyl-10-(3-diethylamino-propionyl)-phenothiazine.

References Cited
UNITED STATES PATENTS 3,325,486   6/1967   Toldy et al. _____ 260—243

HENRY R. JILES, *Primary Examiner.*

H. I. MOATZ, *Assistant Examiner.*